73-662 SR
XR 3,521,089

INVENTOR.
Otmar M. Stuetzer
BY
Roland A. Anderson
Attorney

3521089
OR IN 310/8.2

3,521,089
PIEZOELECTRIC FEEDTHROUGH DEVICE

Othmar M. Stuetzer, Albuquerque, N. Mex., assignor to the United States of America as represented by the United States Atomic Energy Commission Filed June 5, 1968, Ser. No. 734,689
Int. Cl. H01v *7/00;* H04r *17/00*
U.S. Cl. 310—8.2 6 Claims

ABSTRACT OF THE DISCLOSURE

A piezoelectric feedthrough mechanism which employs a pair of thin, axially polarized and axially aligned piezoelectric discs of similar configuration separated by an unbroken wall, each transducer having one of its two electroded faces bonded to one of the two opposite wall surfaces. An alternating voltage is applied across the opposite faces of one transducer to excite it in a dilatational thickness mode. The resultant acoustic vibrations are coupled through the wall and excite corresponding vibrations in the other transducer, also in a thickness mode. A piezoelectric voltage is thereby generated across the opposite faces of the other transducer which may be applied to a load circuit. Optimum power transfer or signal transmission of prescribed frequency and broad bandwidth is accomplished by proper interrelation of signal frequency with transducer and wall thickness and by provision of means for strengthening the mechanical bond between the transducers and the wall.

BACKGROUND OF INVENTION

The invention to be described is generally concerned with the field of piezoelectric transducers and, more particularly, with such devices combined with mechanical energy coupling means.

It is frequently desirable to provide means for transmitting electrical energy or high frequency information through a solid barrier or wall into an enclosed space without breaching the wall with electrical connections or otherwise. For example, shielded laboratory test equipment may require the introduction of electrical power without interfering with the continuity of the shield. As another example, it may be important to introduce power into computer logic circuits which are completely surrounded by metallic encasement. The preferred installation in such cases may be either temporary or permanent. The invention provides a solution to this type of problem by taking advantage of the electromechanical properties of piezoelectric materials and the acoustic characteristics of various metals and nonmetals.

It is well known that a properly electroded piezoelectric disc may be excited with an electrical signal to induce acoustic vibrations in a dilatational or shear mode. By the inverse of this phenomenon mechanical excitation of a piezoelectric transducer will produce electrical signals responsive thereto. The use of piezoelectric elements mechanically coupled in pairs to constitute a filter element or transformer is also well known in the prior art. In some instances a pair of piezoelectric discs are joined directly together and in others they may be separated by a cushioning material which contributes to the filtering of unwanted vibrations. Although these prior art devices involve the conversion of electrical signals to acoustic vibrations and the reconversion of such vibrations to electrical signals, they do not afford an efficient solution to the problem described above.

SUMMARY OF INVENTION

It is a general object of this invention to provide a piezoelectric energy transfer mechanism whereby alternating voltage can be transmitted through a wall, without physical penetration thereof, into a completely enclosed space and therein applied to a load circuit.

It is another object of this invention to provide such a piezoelectric energy transfer mechanism with an optimum transfer of electrical power.

It is a further object of this invention to provide such a piezoelectric energy transfer mechanism wherein a signal is transmitted around a prescribed frequency with a broad bandwidth.

It is a still further object of this invention to provide such a piezoelectric energy transfer mechanism with a minimum of mechanical stress between the piezoelectric elements and the wall.

The piezoelectric feed through device of this invention includes a pair of similar disc-shaped axially polarized and axially aligned piezoelectric transducers, each having one of its electroded faces bonded with minimum acoustic loss to one of the opposite surfaces of unbroken wall positioned between them. The transducers are each adapted to vibrate mainly in a dilatational thickness mode. Circuit means connect the first transducer to a source of alternating voltage and the second transducer to a load. The transducers each have an acoustic thickness slightly less than an integral odd multiple of one-half wavelength by a predetermined amount at the frequency of said alternating voltage, such frequency being chosen so that the wall has an acoustic thickness of an integral multiple of one-half wavelength, or less than one-tenth wavelength.

DETAILED DESCRIPTION

Figures 1, 2, 3:
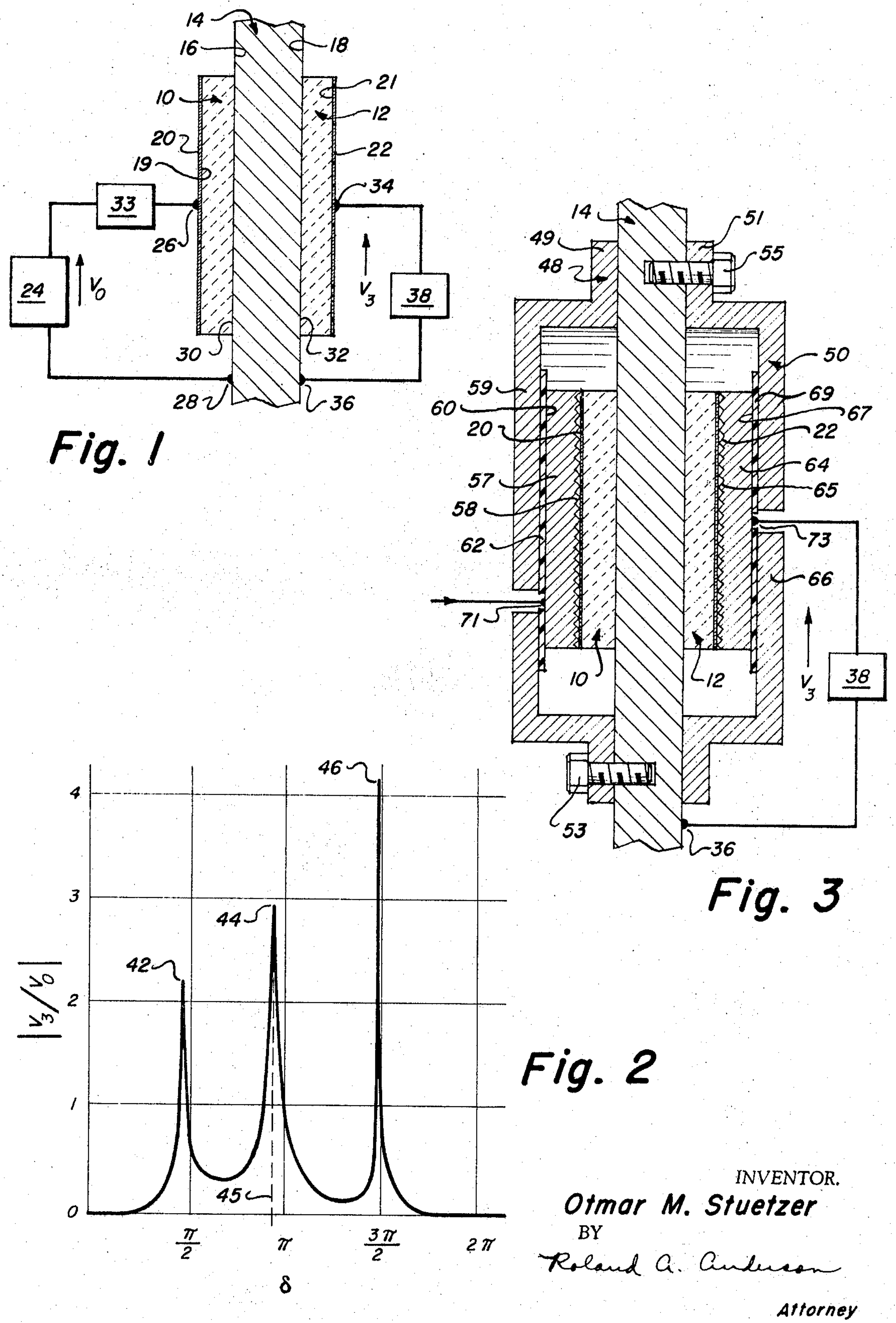
FIG. 1 shows the basic device of this invention in cross section with electrical connections shown in schematic form.
FIG. 2 is a graph illustrating representation values of voltage transfer ratio versus phase angle for a device in accordance with this invention.
FIG. 3 illustrates a modification of the invention employing separate means for maintaining the mechanical bond of the transducers.

Attention is now directed to FIG. 1 of the drawings which illustrates a general embodiment of the invention in cross section. A pair of similar polarized piezoelectric transducers 10 and 12 are positioned on opposite sides of an unbroken wall 14. Transducers 10 and 12 may be conveniently formed as axially polarized flat circular discs which are in substantial axial alignment with one another. Desirable compositions include lead-zirconate-titanate formulations and quartz. Wall 14 is representative of any barrier of metallic or nonmetallic material through which it is desired to transmit electrical energy into an enclosed space. It is not necessarily continuous. It may be, for example, a fine mesh screening. Surface 16 of wall 14 is contiguous with inner face 30 of transducer 10. In like manner opposite surface 18 of wall 14 is contiguous with inner face 32 of transducer 12.

It is desirable that an effective mechanical bond exist between each of transducers 10 and 12 and wall 14 in order to minimize acoustic loss. Ideally the bonding material (not shown) should be applied in a very thin coating on the order of 1 micron, and should have high acoustic velocity, high dielectric constant, and high stiffness. For permanence an epoxy resin is a good choice and it should be applied to the entire mating surfaces as above described, which should preferably be clean and flat. For temporary bonds a heavy oil such as castor oil may be employed instead of epoxy resin.

Outer face 19 of transducer 10 may be provided with an electrode 20 coextensive therewith. Similarly outer face 21 of transducer 12 may be provided with electrode 22 also coextensive therewith. Electrodes 20 and 22 should be as thin as possible consistent with current handling requirements. They may conveniently be electrodeposited layers of silver, chromium, or gold.

If wall 14 is nonmetallic, it becomes necessary, in addition to the above, to provide an electroded surface (not shown) between transducers 10 and 12 and wall 14. This may be, for example, a suitable sprayed-on conductive coating applied to surfaces 16 and 18, respectively, of wall 14. If wall 14 is metallic, the need for such coating is eliminated.

Suitable electrical connection may be made between a source of alternating voltage 24 with peak value $V_0$ and terminal 26 affixed to electrode 20. A similar connection may be made between source 24 and terminal 28 on surface 16 of wall 14. An impedance 33 represented in block form is included between source 24 and terminal 26 to indicate means for impedance matching if required. It is understood that if wall 14 is of nonmetallic construction, electrode means (not shown) will be provided connecting terminal 28 with inner face 30 of transducer 10.

An output load 38 represented in block form is electrically connected across transducer 12 by means of terminal 34 applied to electrode 22 and terminal 36 applied to surface 18 of wall 14. Again, if wall 14 is nonmetallic, it is understood that electrode means are provided connecting terminal 36 with inner face 32 of transducer 12. The peak value of voltage available across load 38 is represented by $V_3$.

In operation, an alternating voltage from source 24 is applied across transducer 10 at terminals 26 and 28. This will excite acoustic vibrations in transducer 10 which for thin discs (i.e., diameter equal to or greater than five times thickness) will be substantially in a dilatational thickness mode. The thickness mode will cause the minimum amount of excitation of wall 14 outside the area of the device of this invention. The vibration of transducer 10 is mechanically coupled (with the aid of the bonding resin) through wall 14 to induce corresponding acoustic vibration, also in the thickness mode, of similar transducer 12. By piezoelectric action transducer 12 reconverts these vibrations to an electrical signal having peak value $V_3$, which appears between terminals 34 and 36 and is thus applied across load 38.

This device will normally be employed either to transmit signal information around a prescribed frequency with broad bandwidth requirements from source 24 to load 38 or to transfer optimum power between these two points where bandwidth is less important and frequency may be selected. In either case it is important to minimize acoustic reflections and mechanical stress on the bond between each of transducers 10 and 12 and wall 14. In order to accomplish these results it is desirable to select a signal frequency such that transducers 10 and 12 each have an acoustic thickness as close as possible to one-half wavelength consistent with a resonant voltage condition and that wall 14 has an acoustic thickness either very small relative to one wavelength or is an integral multiple of a half wavelength. If frequnecy is prescribed and the thickness of wall 14 cannot be controlled, then at least transducers 10 and 12 may be selected to conform to the above requirement.

By making certain simplifying assumptions which yield results which can be successfully applied to practical devices in accordance with this invention, a solution may be derived for the voltage transfer ratio $V_3/V_0$ in terms of the phase angle $\delta=\omega s/v$ where $\omega=2\pi f$ (frequency of transmission), $s$=transducer thickness, and $v$=acoustic velocity of the transducer material. These assumptions are as follows. The device works into a load with a substantially ohmic component. The present of large circuit losses permits the neglect of materials losses. Transducers 10 and 12 are considered to be thin discs identical in size and material operating in thickness mode with unidimensional strain. The separating wall must be relatively thin with respect to the thickness of transducers 10 and 12 or have an acoustic thickness of an integral multiple of one-half wavelength. The solution may be expressed as follows:

$$\frac{V_3}{V_0}=\omega RC\left[\frac{\delta^2}{\pi}\cdot\frac{-j\bar{k}^2(1-\cos\delta)^2}{2AB-j\omega RC\frac{\delta^2}{\pi}(A\sin\delta+B\cos\delta)}\right]$$

where:

R=ohmic resistance of load 38

$C=\epsilon A_t/s$ $\epsilon$=dielectric constant of transducers 10 and 12

$A_t$=electroded contact area of transducers 10 and 12

$A=\bar{k}^2\sin\delta-\delta\cos\delta$ $B=2\bar{k}^2(1-\cos\delta)-\delta\sin\delta$ $\bar{k}$=electromechanical coupling coefficient for transducers 10 and 12

By selecting specific load conditions and transducer characteristics, numerical solutions for this equation can be obtained. This is done most conveniently with the aid of a computer. FIG. 2, for example, illustrates a plot of values of $|V_3/V_0|$ versus $\delta$ under the conditions that $\bar{k}=.5$ and $\omega RC=3$. FIG. 2 shows that resonant peaks in voltage transfer ratio exist at points 42, 44, and 46 which correspond to values of phase angle $\delta$ slightly less than $\pi/2$, $\pi$ and $3\pi/2$, respectively. From the equation $s=\delta\lambda/2\pi$, we calculate that these values of $\delta$ in turn correspond respectively to values of transducer thickness, $s$, slightly less than $\lambda/4$, $\lambda/2$, and $3\lambda/4$ where $\lambda$=acoustic wavelength in the transducer at the frequency of transmission.

Consider now that under the specific conditions illustrated in FIG. 2 it is desired to select the thickness of transducers 10 and 12 to minimize acoustic reflections and mechanical stress on the bonds between these transducers and wall 14 for signal transmission at a prescribed frequency. The point of voltage resonance is first determined at which the transducer thickness most closely approximates a half wavelength at the frequency of transmission. From FIG. 2 this is observed to be resonant point 44. The bandwidth will be about 10 percent. The value of $\delta$ corresponding to voltage resonant point 44, illustrated by dashed line 45, is seen to be approximately $9\pi/10$. For this value of $\delta$ the acoustic thickness, $s$, for transducers 10 and 12 is about $9\lambda/20$. By appropriate substitution in the equation for $V_3/V_0$ these values can, of course, be determined exactly. Since $\lambda=v/f$, we can now compute the value for thickness, $s$, in millimeters, for example, if the frequency is prescribed. Values for acoustic velocity, $v$, for various piezoelectric transducer materials may be obtained from Berlincourt and Jaffe, "Piezoelectric Transducer Materials," Proceedings of the IEEE, vol. 53, No. 10, October 1965, pp. 1372–1386.

Conversely, if we are permitted to select the frequency of transmission, we can first establish a desirable thickness, $s$, for transducers 10 and 12 and make the frequency correspond in order to satisfy the above requirements for transducer thickness. In this latter case we can also select the frequency such that the wall 14, if not of relatively negligible thickness, i.e., less than one-tenth wavelength at the frequency of transmission, is an integral multiple of one-half wavelength at such frequency. Either of these conditions will tend to minimize acoustic reflections and mechanical bond stresses.

It should also be noted that results similar to the above will apply for transducer thicknesses which are integral odd multiples of one-half wavelength at the frequency of transmission. However, for successive multiples the height of the resonant voltage peaks 42, 44, and 46 will decrease and the bandwidth corresponding to each such peak will also decrease. It has also been determined that as the value of coupling factor, $\bar{k}$, increases, the resonant peaks in FIG. 2 will move to the left and as the product ωRC increases, the resonant peaks move to the right. However, the resonant peak 44 will always be slightly to the left of an abscissa value of $\delta=\pi$ or $s=\lambda/2$. For practical transducer materials, $v$, varies from about $10^5$ cm. to about $3\times10^5$ cm. For transmission frequencies ranging from about 100 kHz. to 10 mHz., the corresponding range of transducer thickness is from about .05 mm. to about 15 mm.

The procedure employed in determining thickness of transducers 10 and 12 in accordance with this invention is now seen to involve the following steps: (1) calculation of representative values of $V_3/V_0$ for values of $\delta$ under specific conditions of load, R; transducer configuration and materials (quantities C and $k$) and frequency of transmission, $f$; (2) determination, conveniently from a graph of such values as in FIG. 2, of the resonant values of $V_3/V_0$ corresponding to an abscissa value $\delta$ most closely approximating but less than $\pi$; (3) determination of the value of transducer thickness, $s$, corresponding to said value of $\delta$. Values of transducer thickness constituting integral odd multiples of this value of $s$ are also acceptable. If both frequency of transmission and transducer thickness are selectable, then the frequency may be chosen such that the proper transducer thickness is provided and also that wall thickness is either less than one-tenth wavelength or an integral multiple of one-half wavelength at such frequency. Tables for acoustic velocity for various metals and nonmetals are readily available. It is noted that an experimental determination of the value of transducer thickness, $s$, satisfying the above conditions may be substituted for steps (1), (2) and (3).

If high power transmission is desired, it is advisable to employ a modification of the mechanism of this invention as shown in FIG. 3. In this configuration clamping means 48 and 50 are employed to prevent mechanical strains from loosening the bonds of transducers 10 and 12. Clamping means 48 and 50 may conveniently consist of cup-shaped members with flanges 49 and 51, respectively. Flange 49 may be secured to wall 14 by means of a plurality of bolts 53. In like manner, flange 51 may be secured to the opposite side of wall 14 by a plurality of bolts 55. A reflecting disc 57 may be conveniently interposed between transducer 10 and force transmitting portion 59 of clamping means 48. Disc 57 has an inner nonsmooth surface 58 in contact with electrode 20 of transducer 10. Disc 57 has an outer surface 60 in face-to-face contact with a thin, nonshrinking insulating material 62 which is also contiguous with force transmitting portion 59. In like manner a reflecting disc 64 is interposed between transducer 12 and force transmitting portion 66 of clamping means 50. Disc 64 has an inner nonsmooth surface 65 in contact with electrode 22 of transducer 12. Disc 64 also has an outer surface 67 in face-to-face contact with insulating means 69 which is also contiguous with force transmitting portion 66. Reflecting discs 57 and 64 should be made of a material with very low acoustic characteristic impedance. In order to maximize the acoustic mismatch between transducers 10 and 12 and discs 57 and 64, respectively, their inner nonsmooth surfaces 58 and 65 should have the least possible area in contact with electrodes 20 and 22. This may be accomplished, for example, by forming sharp edged lands or ridges on surfaces 58 and 65.

Suitable electrical connection may be made to outer surface 60 of disc 57 by means of terminal 71 if disc 57 is of a conductive material. In that event the other electrical connections on the input side of the device will be substantially similar to those shown in FIG. 1. If reflecting disc 57 is nonmetallic, insulating material 62 will become unnecessary and electrical connection will be made directly to electrode 20, for example, by drilling a suitable hole (not shown) through disc 57. In similar fashion electrical connection may be made to outer surface 67 of reflecting disc 64 on the output side of the device by means of terminal 73, assuming disc 64 to be metallic. The remainder of the output electrical connections are as shown in FIG. 1. Again, if reflecting disc 64 is of insulative material, terminal 73 will be affixed to electrode 22 and connections brought through disc 64 by means not shown.

Upon application of an alternating voltage across transducer 10, the device functions substantially as described in connection with FIGS. 1 and 2. The mechanical reliability of the contact between transducers 10 and 12 and wall 14 may be maximized by applying adjustable axial force to transducers 10 and 12 in the direction of wall 14. This may be conveniently accomplished through the mechanism of plurality of bolts 53 and 55. At the same time it is necessary to avoid dissipation of energy in the clamping means 48 and 50. Reflecting discs 57 and 64 have been chosen to accomplish this purpose. Clearly, clamping means 48 and 50 are not restricted to the precise configuration illustrated in FIG. 3 provided they each include suitable means for transmitting axial force to transducers 10 and 12 in the direction of wall 14.

In an experimental version of the mechanism employing clamping means 48 and 50 as in FIG. 3, transducers 10 and 12 consisted of 2.5 mm. discs constructed of a lead-zirconate-titanate composition with 250 mm. diameter. In this latter version the input frequency was 900 kHz. which transferred 60 watts of energy into a light bulb load at 40 percent efficiency. Fifty percent efficiencies at optimum power transfer are expected to be within the realm of this invention with high quality bonding techniques. Efficiencies working through prestressed glass and ceramic walls will not be as high as metal walls but in such cases efficiencies of 30 to 40 percent are not difficult to obtain.

It should be understood that the above-described embodiments of this invention are merely illustrative and that numerous modifications may be made within the spirit and scope of this invention.

What is claimed is:

1. A piezoelectric feedthrough device for transmitting an alternating voltage of prescribed frequency through a wall without physical penetration thereof comprising:

a wall having a predetermined acoustic thickness at said frequency, first and second similar disc-shaped axially polarized piezoelectric transducers separated by said wall, each having an inner and outer electroded face and each adapted to vibrate acoustically in a dilatational thickness mode, said transducers being positioned in axial alignment with their inner faces contiguous with the two opposite surfaces of said wall respectively each of said transducers having an acoustic thickness ($s$) at a maxima as phase angle ($\delta$) increases in the voltage transfer ratio relationship $$V_3/V_0=\omega RC\left[\frac{\delta^2}{\pi}\cdot\frac{-j\bar{k}^2(1-\cos\delta)^2}{2AB-j\omega RC\frac{\delta^2}{\pi}(A\sin\delta+B\cos\delta)}\right]$$

at specific conditions of load and transducer characteristics where $\delta=\omega s/v$,
$\omega=2\pi f$,
$s$=transducer acoustic thickness,
$v$=transducer material acoustic velocity,
R=load resistance,
$C=\epsilon A_t/s$,
$\epsilon$=transducer dielectric constant,
$A_t$=transducer electroded contact area,
$A=\bar{k}^2\sin\delta-\delta\cos\delta$,
$B=2\bar{k}^2(1-\cos\delta)-\delta\sin\delta$, and
$\bar{k}$=transducer electromechanical coupling coefficient, means for bonding the entire inner face of said first and second transducers to said opposite wall surfaces with minimum acoustical losses, circuit means connecting the inner and outer electroded faces of the first transducer to a source of alternating voltage, and circuit means connecting the inner and outer electroded faces of the second transducer to a load.

2. A device as in claim 1 including first and second clamping means for holding said transducers in contiguity with said wall surfaces, said clamping means each including a force transmitting portion substantially coextensive with and in close juxtaposition to the outer face of the transducer associated therewith and a low characteristic acoustic impedance reflecting disc means interposed between and in face-to-face contact with said force transmitting portion and the outer face of said transducer for reflecting acoustic energy back to said transducer, said clamping means also including a rim at the periphery thereof rigidly secured to said wall applying axial force to said first and second transducers respectively in the direction of said wall.

3. A device as in claim 2 wherein the face of each of said reflecting disc means in contact with said transducer outer face has a plurality of ridges in force transmitting contact with said outer face of the transducer associated therewith.

4. A device as in claim 1 wherein said wall has an acoustic thickness of less than about one-tenth wavelength at the prescribed frequency.

5. A device as in claim 1 wherein said wall has an acoustic thickness equal to an integral multiple of about one-half wavelength at the prescribed frequency.

6. A device as in claim 1 wherein each of said transducers has an acoustic thickness ($s$) of an integral odd multiple of less than about one-half wavelength at the prescribed frequency.

References Cited

UNITED STATES PATENTS

| | | | |
|---|---|---|---|
| 2,323,030 | 6/1943 | Gruetzmacher | 310—8.2 |
| 2,433,963 | 1/1948 | Tarbox et al. | 73—67.6 X |
| 2,830,201 | 4/1958 | Wilson | 310—8.3 |
| 2,833,999 | 5/1958 | Howry | 310—8.2 X |
| 3,304,534 | 2/1967 | Sykes | 310—8.1 X |
| 3,321,648 | 5/1967 | Kolm | 310—8.2 |
| 3,342,284 | 9/1967 | Baird | 73—67.6 X |
| 3,271,622 | 9/1966 | Malagodi et al. | 310—8.1 X |

WARREN E. RAY, Primary Examiner

M. O. BUDD, Assistant Examiner

U.S. Cl. X.R.

73—67; 310—8.3, 8.5, 9.1